(12) United States Patent
Sugiyama et al.

(10) Patent No.: US 10,124,872 B2
(45) Date of Patent: Nov. 13, 2018

(54) SHIFTING DEVICE FOR OUTBOARD MOTOR

(71) Applicant: SUZUKI MOTOR CORPORATION, Hamamatsu-Shi, Shizuoka (JP)

(72) Inventors: Shuichi Sugiyama, Hamamatsu (JP); Keisuke Daikoku, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/784,990

(22) Filed: Oct. 16, 2017

(65) Prior Publication Data

US 2018/0148149 A1 May 31, 2018

(30) Foreign Application Priority Data

Nov. 29, 2016 (JP) .................................. 2016-231475

(51) Int. Cl.
| | |
|---|---|
| *B63H 21/21* | (2006.01) |
| *B60W 10/04* | (2006.01) |
| *B63H 20/20* | (2006.01) |
| *B63H 20/00* | (2006.01) |
| *B63H 20/24* | (2006.01) |
| *F16H 63/04* | (2006.01) |
| *F16H 63/30* | (2006.01) |
| *F16H 3/14* | (2006.01) |
| *B63H 20/28* | (2006.01) |

(52) U.S. Cl.
CPC ........... *B63H 20/20* (2013.01); *B63H 20/002* (2013.01); *B63H 20/24* (2013.01); *B63H 20/28* (2013.01); *F16H 3/145* (2013.01); *F16H 63/04* (2013.01); *F16H 63/302* (2013.01); *F16H 2063/3056* (2013.01)

(58) Field of Classification Search
CPC ...... B63H 20/002; B63H 20/14; B63H 20/20; B63H 20/24; B63H 20/28; B63H 2020/14; F16H 63/04; F16H 63/302; F16H 3/145; F16H 2063/3056
USPC ....................................................... 440/75, 86
See application file for complete search history.

(56) References Cited

U.S. PATENT DOCUMENTS

| | | | | |
|---|---|---|---|---|
| 4,668,198 A | * | 5/1987 | Nakamura ........... | B63H 21/265 440/75 |
| 5,009,621 A | * | 4/1991 | Bankstahl ................ | B63H 5/10 416/129 |
| 5,766,047 A | * | 6/1998 | Alexander, Jr. .......... | B63H 5/10 416/129 |
| 5,791,951 A | * | 8/1998 | Staerzl ..................... | B63H 5/10 440/75 |

(Continued)

FOREIGN PATENT DOCUMENTS

JP 2006321262 A 11/2006

*Primary Examiner* — Daniel V Venne
(74) *Attorney, Agent, or Firm* — Troutman Sanders LLP

(57) ABSTRACT

An electric shift actuator is provided in an engine cover in which an engine of an upper unit is accommodated, a forward/reverse shift mechanism is provided in a lower unit, and a shift transmission mechanism including a clutch rod is provided to transmit driving force of the electric shift actuator to the forward/reverse shift mechanism by connecting the electric shift actuator with the forward/reverse shift mechanism, in which the clutch rod is disposed vertically in an intermediate unit on the rear side of a drive shaft that transmits driving force of the engine.

6 Claims, 13 Drawing Sheets

(56) References Cited

U.S. PATENT DOCUMENTS

| | | | |
|---|---|---|---|
| 6,386,350 B1* | 5/2002 | Sato | B63H 20/20 192/109 A |
| 2006/0264129 A1 | 11/2006 | Mizuguchi et al. | |
| 2007/0254540 A1* | 11/2007 | Miyashita | F02B 61/045 440/86 |
| 2008/0102718 A1* | 5/2008 | Hikosaka | B63H 20/00 440/86 |
| 2008/0261469 A1 | 10/2008 | Mizuguchi et al. | |
| 2015/0004855 A1* | 1/2015 | Wiatrowski | B63H 20/20 440/75 |

\* cited by examiner

F I G. 11
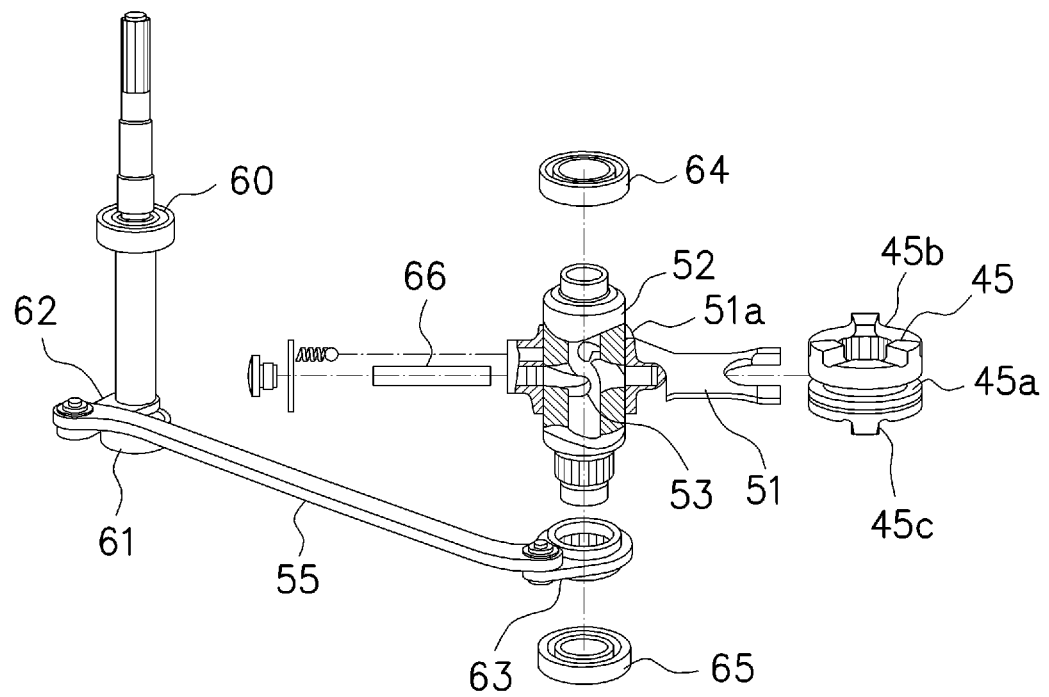

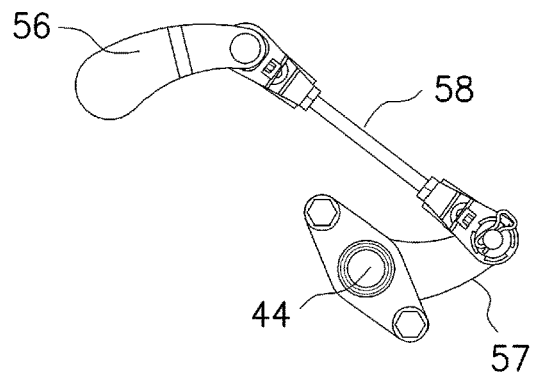
F I G. 12A
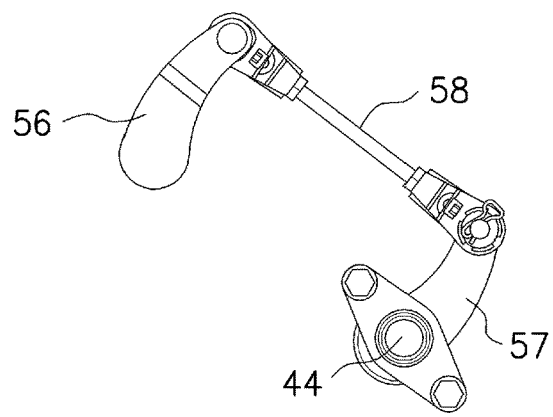
F I G. 12B
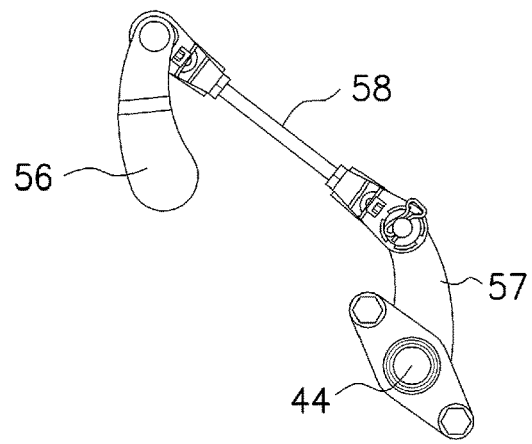
F I G. 12C

SHIFTING DEVICE FOR OUTBOARD MOTOR

CROSS-REFERENCE TO RELATED APPLICATIONS

This application is based upon and claims the benefit of priority of the prior Japanese Patent Application No. 2016-231475, filed on Nov. 29, 2016, the entire contents of which are incorporated herein by reference.

FIELD OF THE INVENTION

The present invention relates to a shifting device applicable to an outboard motor and capable of performing forward/reverse switching with an electric actuator.

BACKGROUND

For example, as a conventional forward/reverse shifting device performing forward/reverse switching with an electric actuator and applicable to this type of outboard motor, an outboard motor discussed in Japanese Laid-open Patent Publication No. 2006-321262 is configured to transmit operational force of the electric actuator from a clutch rod to a shift mechanism. The clutch rod is arranged in such a way as to pass through the interior of a pilot shaft disposed on the front side of the drive shaft.

According to a conventional technique, a forward/reverse shifting device including an electric actuator and a clutch rod is provided in the main body of an outboard motor. On the other hand, the pilot shaft is fixed together with a clamp bracket and a swivel bracket to the hull side. Since the outboard motor body is mounted via a mounting device, a relative displacement occurs between the clutch rod and the pilot shaft. More specifically, the mounting device is equipped with a rubber expanding and contracting when subjected to propeller thrust during travelling or generation of steering force, and accordingly, a relative positional displacement occurs between the clutch rod and the pilot shaft positioned around the clutch rod.

There is a limitation in increasing the thickness of the clutch rod because of necessity to secure a sufficient clearance between the clutch rod and the peripheral pilot shaft. It is not necessarily easy to assure sufficient rigidity. Therefore, the electric actuator is required to operate with an adequate operation amount in anticipation of the deflection of the clutch rod. Thus, it is difficult to perform accurate shift control without any measure.

SUMMARY

In view of the foregoing circumstances, the present invention intends to provide a shifting device for an outboard motor that can realize an accurate shift control while enhancing the rigidity of a shift transmission mechanism including the clutch rod.

A shifting device for an outboard motor according to the present invention is configured to detect a shift operation by a ship operator and electrically perform a forward/reverse shift operation for the outboard motor based on the detected shift operation. The outboard motor includes an upper unit, a lower unit, and an intermediate unit connecting the upper unit to the lower unit. An electric shift actuator is provided in an engine cover in which an engine of the upper unit is accommodated, a forward/reverse shift mechanism is provided in the lower unit, and a shift transmission mechanism including a clutch rod is provided to transmit driving force of the electric shift actuator to the forward/reverse shift mechanism by connecting the electric shift actuator with the forward/reverse shift mechanism. The clutch rod is disposed on the rear side of a drive shaft that transmits driving force of the engine so as to extend in the vertical direction in the intermediate unit.

BRIEF DESCRIPTION OF THE DRAWINGS

FIG. 11 is an exploded perspective view illustrating an exemplary configuration around the shift transmission mechanism according to an embodiment of the present invention.

FIG. 12A is a top view illustrating a displacement action around a bell crank relating to the electric shift actuator according to an embodiment of the present invention.

FIG. 12B is a top view illustrating a displacement action around the bell crank relating to the electric shift actuator according to an embodiment of the present invention.

FIG. 12C is a top view illustrating a displacement action around the bell crank relating to the electric shift actuator according to an embodiment of the present invention.

DETAILED DESCRIPTION

Embodiments of a shifting device for an outboard motor according to the present invention will be described in detail below with reference to attached drawings.

An exemplary shifting device for an outboard motor according to an embodiment of the present invention is configured to detect a shift operation by a ship operator and electrically perform a forward/reverse shift operation for the outboard motor based on the detected shift operation. The outboard motor includes an upper unit, a lower unit, and an intermediate unit connecting the upper unit to the lower unit. An electric shift actuator is provided in an engine cover in which an engine of the upper unit is accommodated, a forward/reverse shift mechanism is provided in the lower unit, and a shift transmission mechanism including a clutch rod is provided to transmit driving force of the electric shift actuator to the forward/reverse shift mechanism by connecting the electric shift actuator with the forward/reverse shift mechanism. The clutch rod is disposed vertically in the intermediate unit on the rear side of a drive shaft that transmits driving force of the engine.

In the shifting device for the outboard motor according to the present invention, no relative displacement occurs in the radial direction of the clutch rod between the clutch rod and constituent components of the outboard motor arranged around the clutch rod. Therefore, the thickness of the clutch rod can be increased to secure sufficient rigidity. Enhancing the rigidity of the clutch rod can improve accuracy of the shift operation because of reduction of a stroke that may be caused by the deflection and can enhance reliability of the shift operation because of increase of transmissible operating force.

Figure 1:
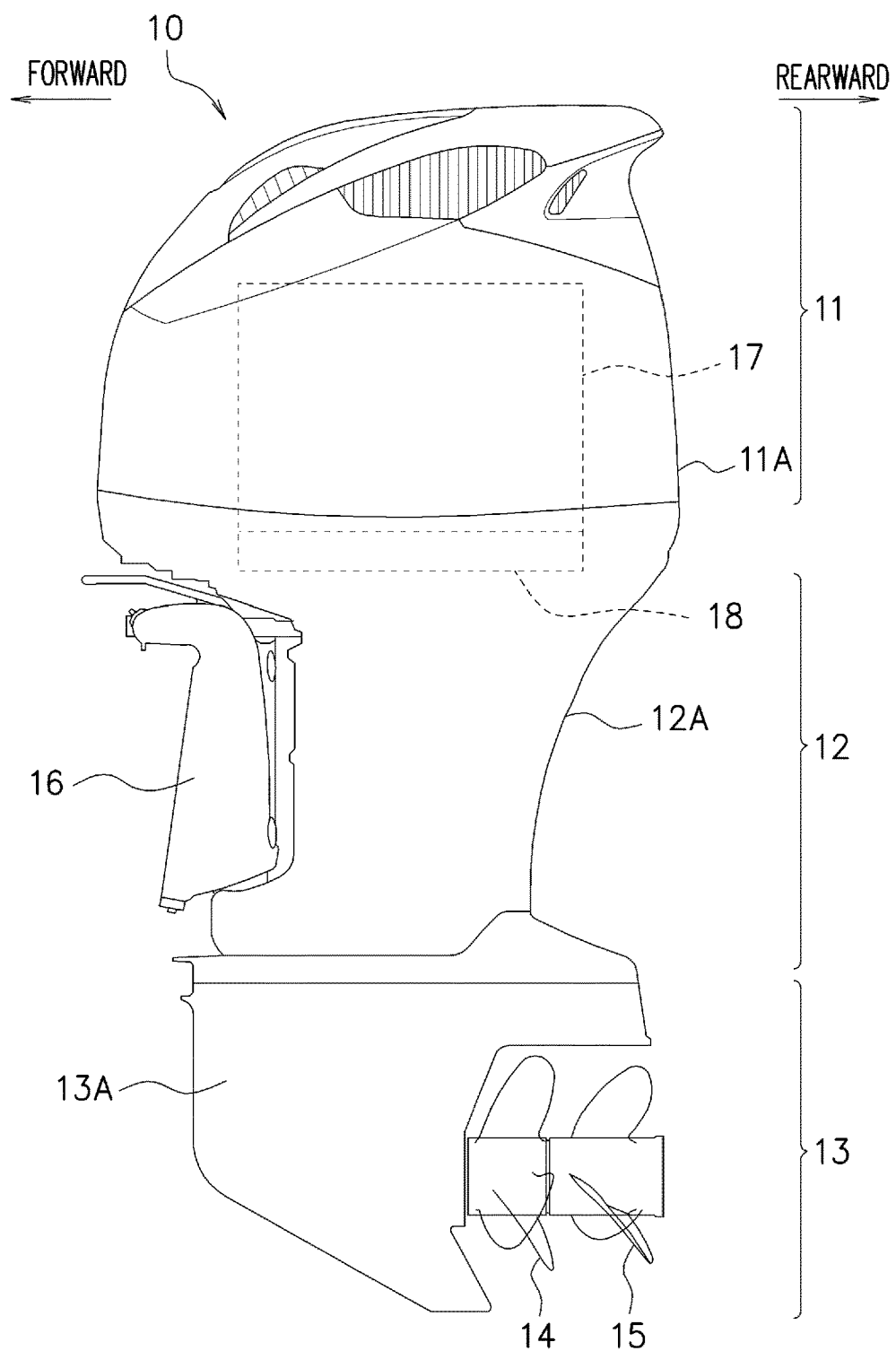
FIG. 1 is a left side view illustrating an exemplary schematic configuration of an outboard motor according to the present invention.

FIG. 1 is a left side view illustrating the entire configuration of an outboard motor 10, as an example to which the present invention can be applied. As illustrated in FIG. 1, the outboard motor 10 includes an upper unit 11, a middle unit (i.e., intermediate unit) 12, and a lower unit 13, which are disposed sequentially from top to bottom. An engine cover 11A, a drive shaft housing 12A, and a gearcase 13A, which correspond to the above-mentioned upper, middle, and lower units respectively, are arranged so as to constitute the casing (exterior) of the outboard motor 10. A front propeller 14 and a rear propeller 15 are coaxially disposed on the rear side of the lower unit 13. In a preferred embodiment of the present invention, an exemplary outboard motor including a contra-rotating propeller is typically adopted. The front propeller 14 and the rear propeller 15 serve as two propellers rotating in opposite directions, which cooperatively constitute the contra-rotating propeller. In a preferred embodiment of the present invention, it is assumed that the outboard motor 10 can move forward if the front propeller 14 rotates in the clockwise direction and the rear propeller 15 rotates in the counterclockwise direction, when seen from the rear side. A bracket device 16 for attaching the outboard motor 10 to a hull is provided on the front side of the drive shaft housing 12A, so that the outboard motor 10 can be attached to a stern board or the like of a ship via the bracket device 16 when it is used.

Figure 2:
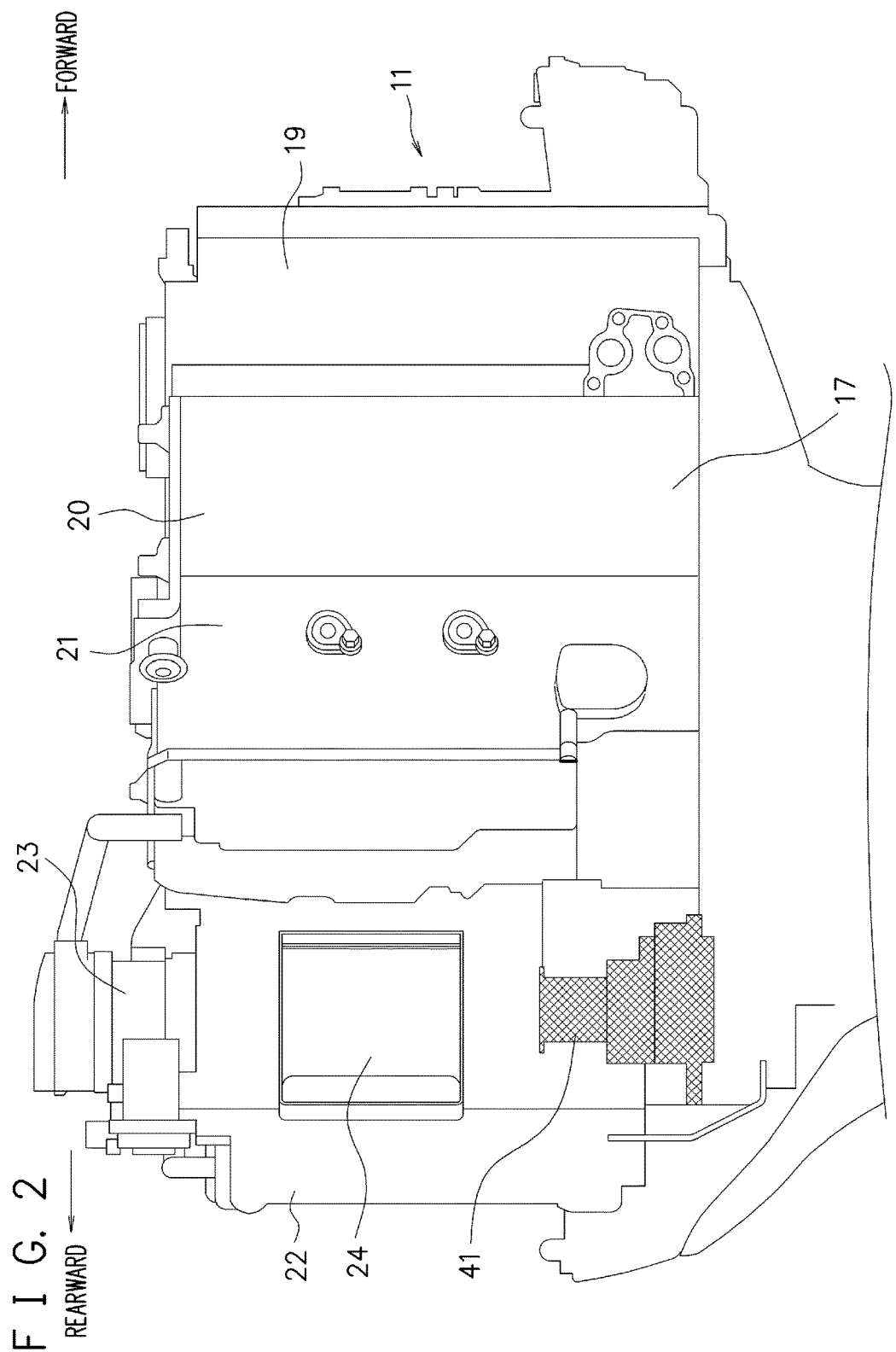
FIG. 2 is a left side view illustrating an exemplary configuration of an upper unit of the outboard motor according to the present invention.

As illustrated in FIG. 2, the engine 17 is accommodated inside the engine cover 11A in a state where the engine 17 is supported on an engine holder 18 (refer to FIG. 1). For example, a vertical type water-cooled engine is adoptable as the engine 17. In this case, the engine 17 is constituted by a combination of a crankcase 19, a cylinder block 20, a cylinder head 21, and the like as illustrated in FIG. 2. In the engine 17, the crankcase 19 is located at the frontmost position, the cylinder block 20 is located on the rear side of the crankcase 19, and the cylinder head 21 is located at the rearmost position.

Figure 3:
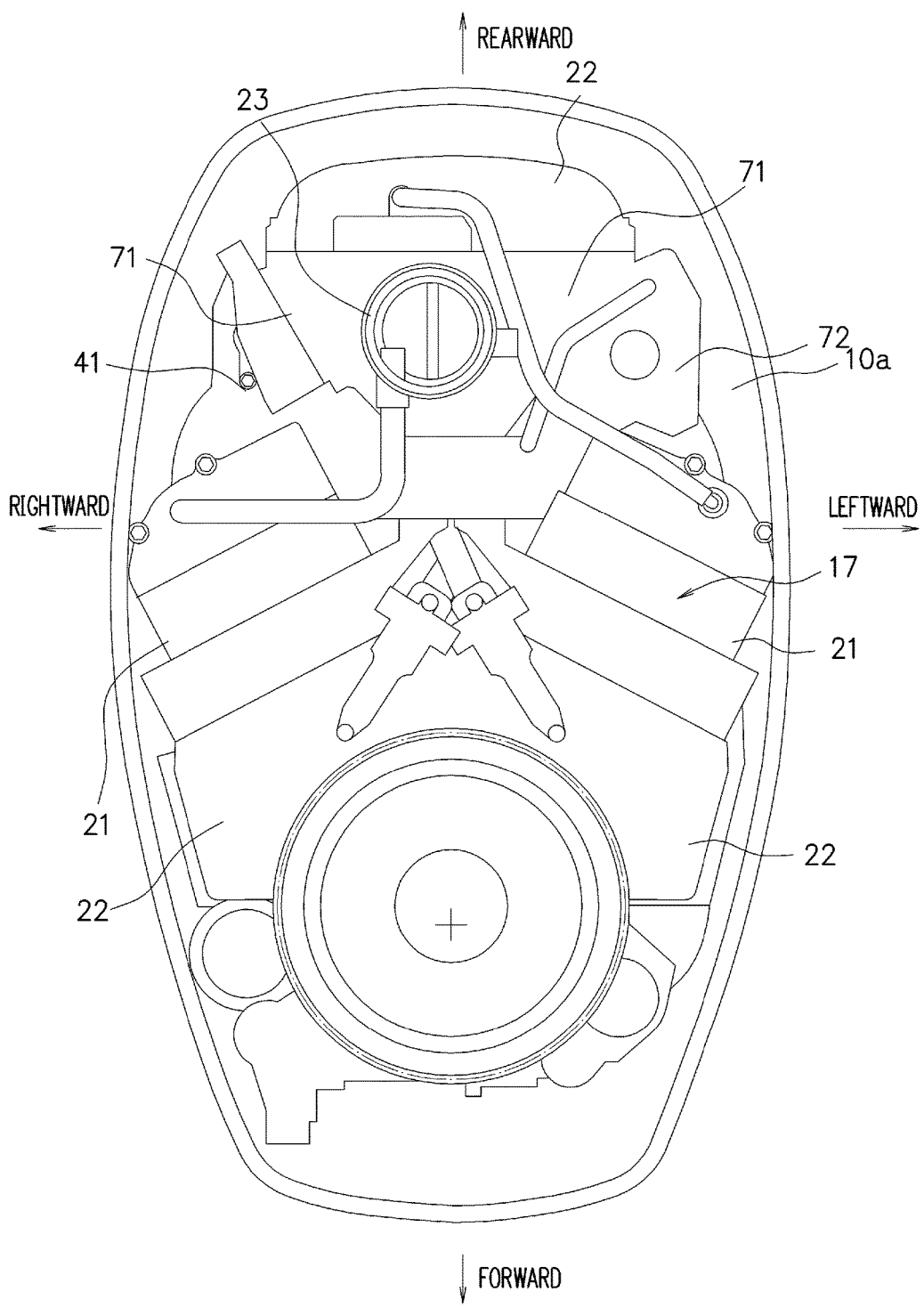
FIG. 3 is a top view illustrating an exemplary configuration of the upper unit of the outboard motor according to the present invention.

The engine 17 is the vertical type mounted and supported vertically via the engine holder 18 of the middle unit 12 so that the crankshaft thereof faces the vertical direction. The engine 17 adopted in the present embodiment is, for example, a V-type four-cycle multi-cylinder engine that includes a left bank diagonally extending leftward and rearward and a right bank diagonally extending rearward and rightward. An in-line multi-cylinder engine or the like is also adoptable. As illustrated in FIGS. 2 and 3, a surge tank 22, a throttle body 23 and the like, which constitute an intake system, are additionally attached to the engine 17, so that combustion air can be supplied through these members to the engine 17. Further, the engine 17 is equipped with a valve system for driving and controlling intake and exhaust valves of the intake and exhaust systems, a cooling system for cooling the engine, and a lubricating system for lubricating moving parts of the engine, whose operations are controlled by a control unit (e.g., engine control unit (ECU)) 24. Under the control of the ECU 24, the engine 17 can perform various operations smoothly.

Figure 4:
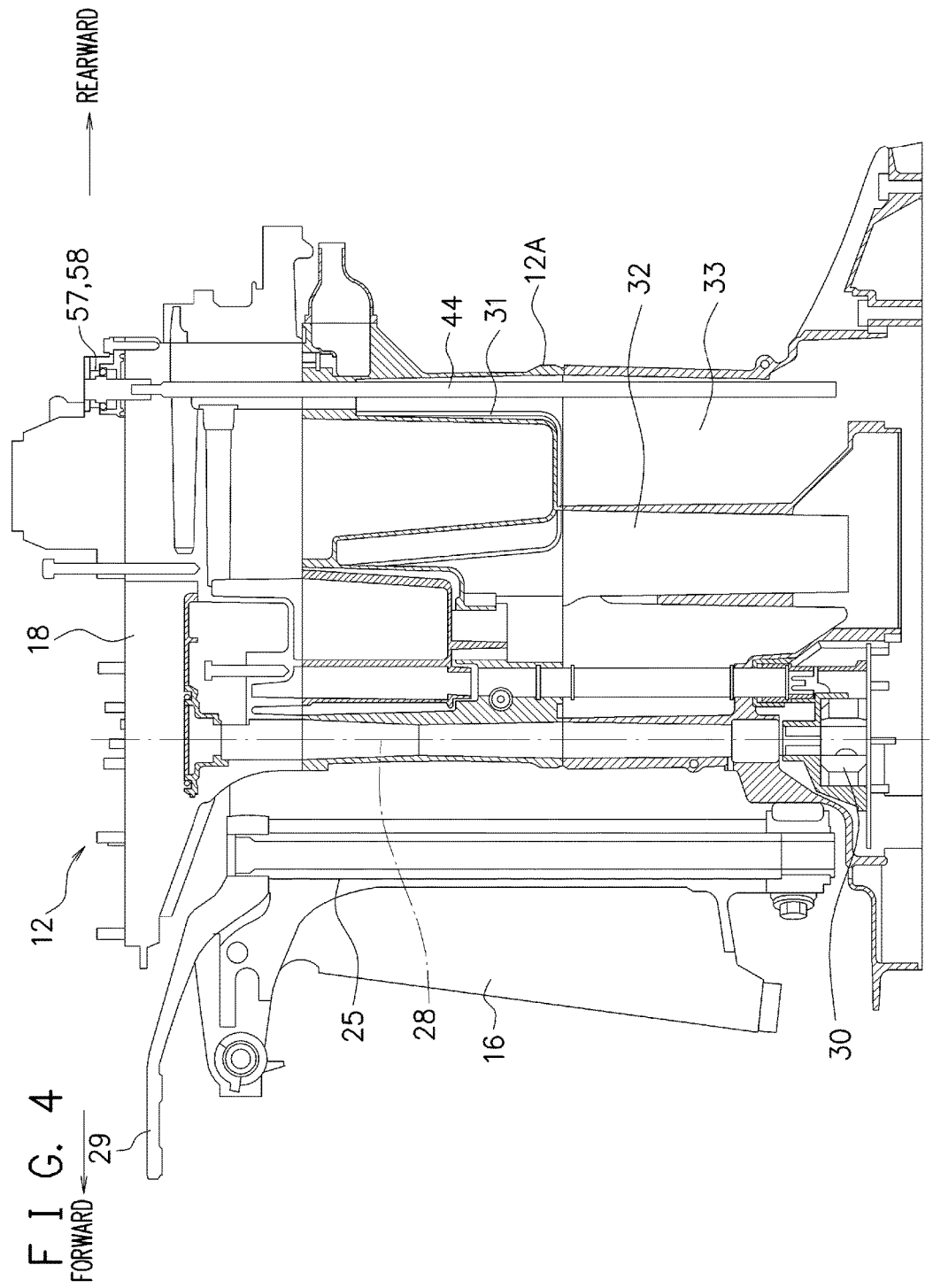
FIG. 4 is a cross-sectional view illustrating an exemplary configuration of a middle unit of the outboard motor according to the present invention.
Figure 5:
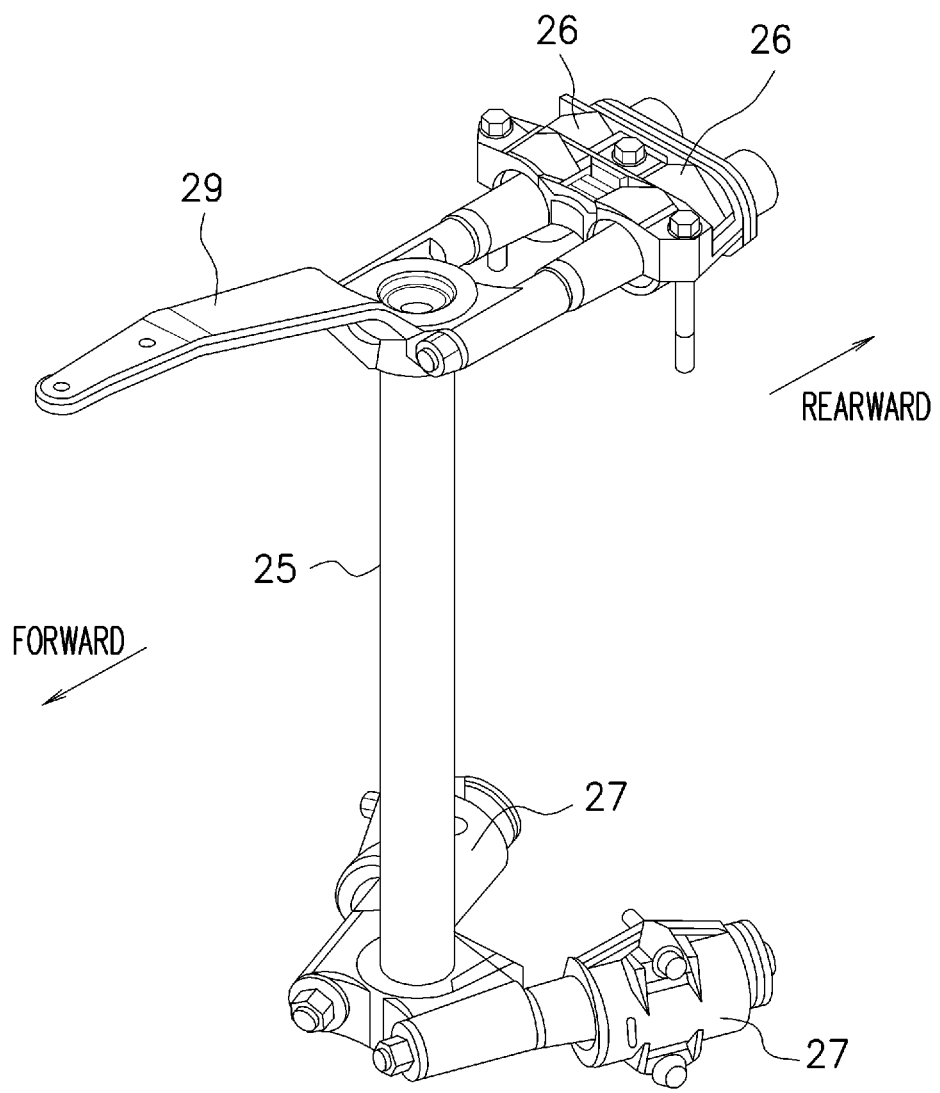
FIG. 5 is a perspective view illustrating an exemplary configuration of a mounting device according to an embodiment of the present invention.

As understood from FIG. 4 illustrating the middle unit 12, the bracket device 16 (swivel bracket) supports a steering shaft 25 so as to be horizontally rotatable. As illustrated in FIG. 5, an upper mount 26 is arranged correspondingly to an upper end portion of the steering shaft 25 and a lower mount 27 is arranged correspondingly to a lower end portion of the steering shaft 25. A drive shaft 28 directly or indirectly connected to a lower end portion of the crankshaft of the engine 17 is disposed so as to penetrate through the middle unit 12 in the vertical direction as illustrated in FIG. 4. The drive shaft 28 is accommodated in the drive shaft housing 12A so as to extend into the gearcase 13A of the lower unit 13. The driving force of the drive shaft 28 can be transmitted to a propeller shaft, described below, disposed in the gearcase 13A of the lower unit 13.

An outboard motor body of the outboard motor 10 is integrally and rotatably supported together with the steering shaft 25 via the upper mount 26 and the lower mount 27. The outboard motor 10 can be steered when a steering bracket 29 fixed to an upper end portion of the steering shaft 25 causes a turning motion. In this case, anti-vibration rubbers provided in the upper mount 26 and the lower mount 27 can attenuate engine vibrations generated by the engine 17 of the outboard motor 10 as well as variations in propeller thrust and steering force (lifting power), and can prevent them from being directly transmitted to the hull.

The upper mount 26 is disposed at a position higher than the bracket device 16 and the stern board (transom board) of the hull. Further, the lower mount 27 is disposed at a lower position of the bracket device 16 overlapping with the stern board in the vertical direction. In this case, the upper mount 26 is arranged to be parallel to a front-rear center line extending in the back and forth direction of the outboard motor 10. On the other hand, the lower mount 27 is disposed in such a way as to form a V shape crossing on the front side of the steering shaft 25 (serving as a support shaft) in plan view by inclining it at the same angle to right and left with respect to the front-rear center line extending in the back and forth direction of the outboard motor 10.

Figure 6:
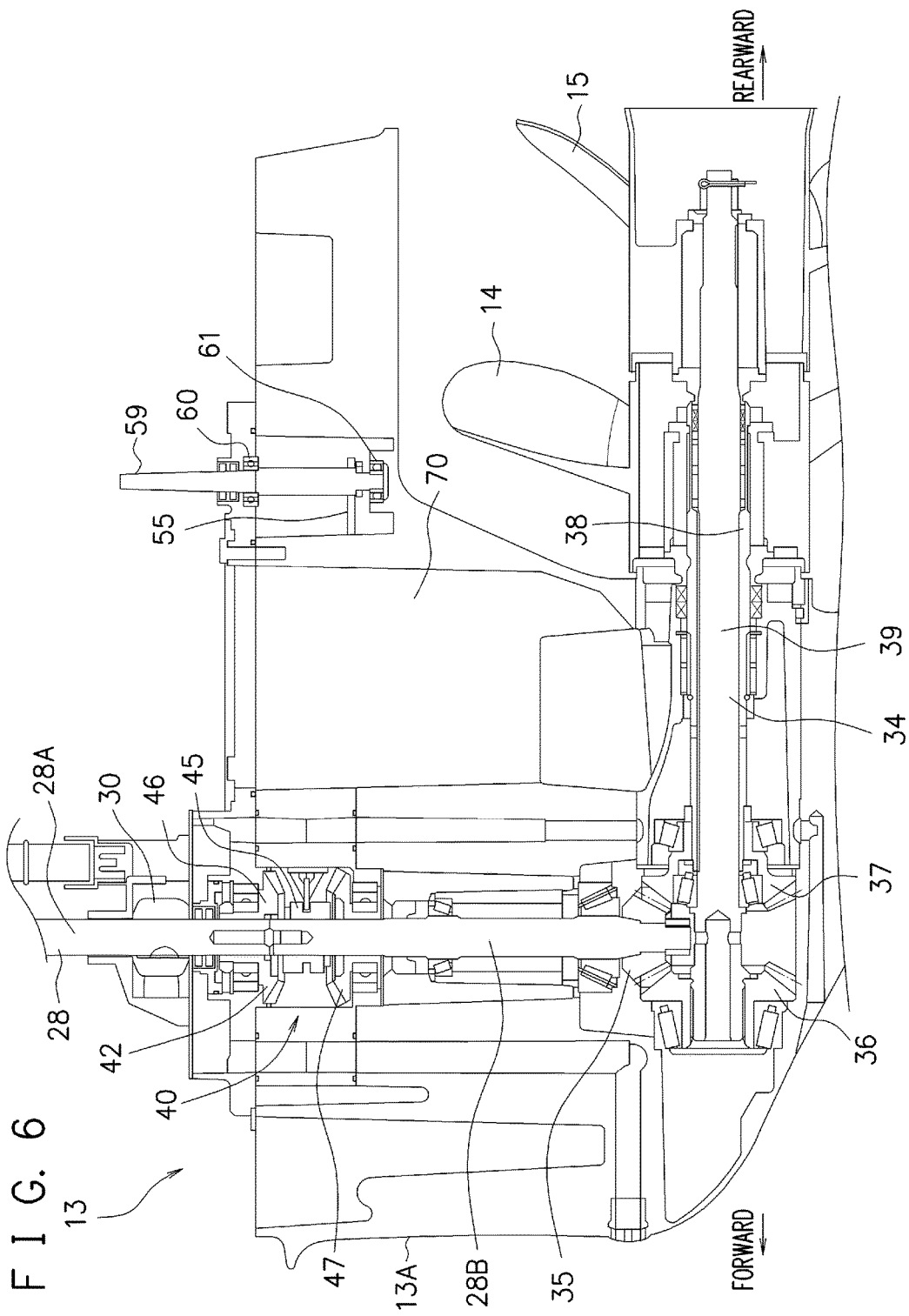
FIG. 6 is a cross-sectional view illustrating an exemplary configuration of a lower unit of the outboard motor according to the present invention.

Further, in the middle unit 12, as understood from FIG. 4 or FIG. 6, a cooling water pump 30, serving as an accessory, is pivotally attached to the drive shaft 28 in the vicinity of an upper surface of the lower unit 13. The cooling water pump 30 takes in water from underwater outside the outboard motor 10 and supplies cooling water to the engine 17 side. In this case, although not illustrated in detail in the drawings, a water inlet is provided at an appropriate position on a side surface of the gearcase 13A. The water inlet is connected to the cooling water pump 30 via a cooling water passage. A cover capable of filtering foreign substances is attached to the water inlet.

Further, an oil pan 31 is disposed below the engine holder 18 so as to be positioned closely to the rear end of the drive shaft housing 12A. An oil pump (not illustrated) sucks up lubricating oil from the oil pan 31 and discharges the lubricating oil via a lubricating oil passage in such a way as to supply the lubricating oil to each lubrication requiring portion of the engine 17.

Furthermore, in the middle unit 12, exhaust passages respectively communicating with combustion chambers in the right and left banks of the engine 17 are communicated, along the outer side of the right and left banks in the width direction of the outboard motor, with an exhaust passage 32 provided in the drive shaft housing 12A, as illustrated in FIG. 4. The exhaust passage 32 in the middle unit 12 extends downward and communicates with an exhaust passage formed in the lower unit 13. The exhaust gas generated by the engine 17 is discharged via the exhaust passage of each bank to the exhaust passage 32 and finally discharged from the exhaust passage of the lower unit 13 into the water. Further, in the middle unit 12, a cooling water drop passage 33 is provided to discharge the cooling water supplied from the cooling water pump 30 to the engine 17 to the outside of the outboard motor 10.

The oil pan 31, the exhaust passage 32, and the cooling water drop passage 33 are disposed in the middle unit 12 and positioned on the rear side of the drive shaft 28.

As understood from FIG. 6, a first input shaft 28A and a second input shaft 28B, which are separated from each other, constitute the drive shaft 28 that transmits rotational power of the engine 17 to the propeller shaft 34. A shifting device, which will be described in detail below, is disposed between the first input shaft 28A and the second input shaft 28B. The shifting device performs an operation for connecting/disconnecting the rotational power and switching of the rotational direction (more specifically, switching of shift position) between the first input shaft 28A and the second input shaft 28B that constitute the drive shaft 28. The rotational power output from the engine 17 is transmitted to the front propeller 14 and the rear propeller 15 via the first input shaft 28A, the shifting device, the second input shaft 28B, and the propeller shaft 34.

As understood from FIG. 6 illustrating the lower unit 13, a pinion gear 35 is attached to a lower end of the drive shaft 28 (the second input shaft 28B) in the gearcase 13A. A front gear 36 and a rear gear 37 are a pair of bevel gears meshing with the pinion gear 35. The front gear 36 is disposed on the front lower side of the pinion gear 35. The rear gear 37 is disposed on the rear lower side of the pinion gear 35. Members constituting the propeller shaft 34 are an outer shaft 38 and an inner shaft 39, which are arranged coaxially and extend in the back and forth direction. The rear gear 37 and the front gear 36 are attached to front end portions of the outer shaft 38 and the inner shaft 39, respectively. Further, the front propeller 14 and the rear propeller 15 are attached to the outer shaft 38 and the inner shaft 39, respectively.

The rotational power transmitted from the second input shaft 28B to the pinion gear 35 is transmitted to both the front gear 36 and the rear gear 37, so that the front gear 36 and the rear gear 37 can rotate in mutually opposite directions. The rotational power transmitted to the front gear 36 is transmitted to the rear propeller 15 via the inner shaft 39. The rotational power transmitted to the rear gear 37 is transmitted to the front propeller 14 via the outer shaft 38. Accordingly, the front propeller 14 and the rear propeller 15 can rotate in mutually opposite directions.

Figure 7:
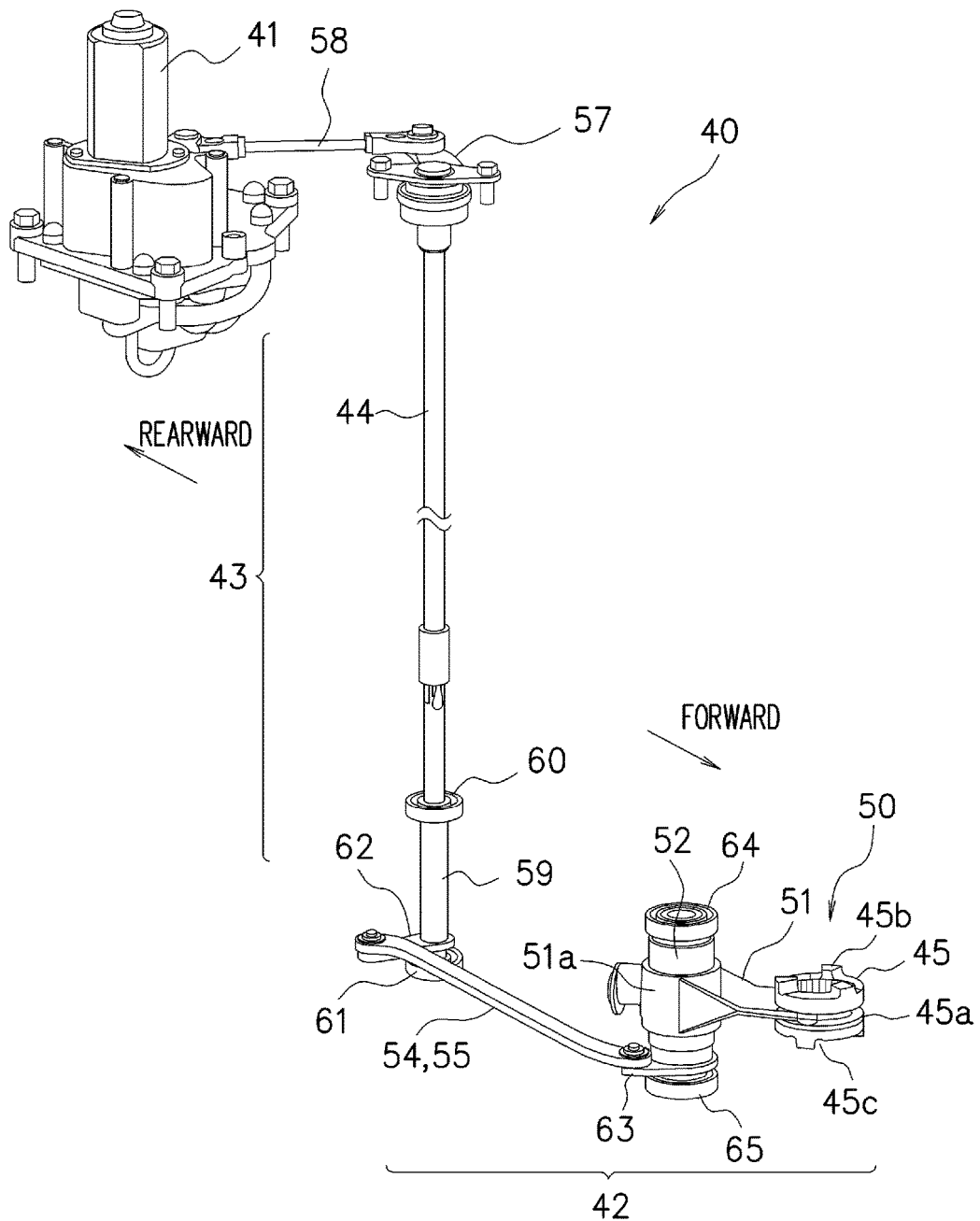
FIG. 7 is a perspective view illustrating an exemplary overall configuration of a shifting device according to an embodiment of the present invention.

As illustrated in FIG. 6 and the like, a shifting device 40 is provided to perform the operation for connecting/disconnecting the rotational power and switching of the rotational direction between the first input shaft 28A and the second input shaft 28B of the drive shaft 28. FIG. 7 illustrates a schematic configuration of the shifting device 40. The shifting device 40 includes an electric shift actuator 41 (refer to FIG. 2) provided in the engine cover 11A accommodating the engine 17 of the upper unit 11, a forward/reverse shift mechanism 42 (refer to FIG. 6) provided in the lower unit 13, and a shift transmission mechanism 43 including a clutch rod 44 (refer to FIG. 4) that connects the electric shift actuator 41 and the forward/reverse shift mechanism 42 and transmits the driving force of the electric shift actuator 41 to the forward/reverse shift mechanism 42.

The clutch rod 44 is disposed in the middle unit (i.e., the intermediate unit), so as to extend in the vertical direction on the rear side of the drive shaft 28 transmitting the driving force of the engine 17 as understood from FIG. 4.

Further, as illustrated in FIG. 4, in the middle unit 12, the oil pan 31, the exhaust passage 32, and the cooling water drop passage 33 are provided on the rear side of the drive shaft 28. The clutch rod 44 is disposed in the cooling water drop passage 33, which are provided on the rear side of the oil pan 31 and the exhaust passage 32.

The forward/reverse shift mechanism 42 includes the first input shaft 28A rotated by the engine 17 and the second input shaft 28B disposed coaxially with the first input shaft 28A and to which the rotation of the first input shaft 28A is transmitted. Further, as understood from FIG. 8, the forward/reverse shift mechanism 42 includes a dog clutch 45 that is a clutch member integrally and rotatably supported with the second input shaft 28B, an upper gear 46 rotated by the first input shaft 28A, a lower gear 47 rotating inversely with respect to the upper gear 46, an intermediate gear 49 positioned between the upper gear 46 and the lower gear 47 and supported by an intermediate shaft 48 perpendicular to the drive shaft 28, and a clutch member operating mechanism 50 capable of moving the dog clutch 45 to each of forward, neutral, and reverse positions.

The clutch member operating mechanism 50 includes a shift fork 51, a shift cam 52 having a helical lead groove 53 and rotatably supported, and a link mechanism 54 that connects the shift cam 52 and the clutch rod 44 with a shift bar 55.

Figure 8:
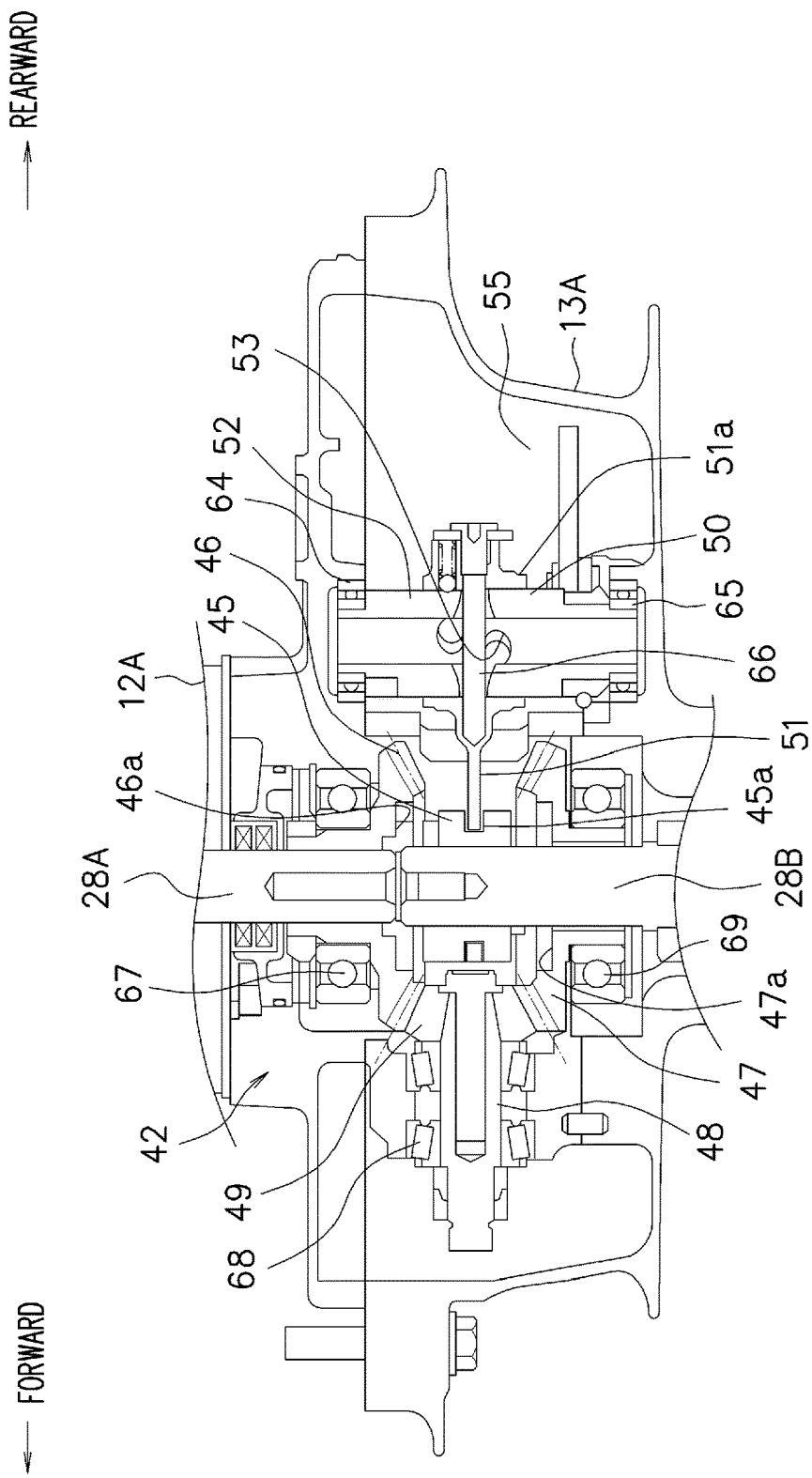
FIG. 8 is a cross-sectional view illustrating an exemplary configuration of an essential part around the shifting device according to an embodiment of the present invention.

The shift cam 52 is disposed on the rear side of the drive shaft 28 as illustrated in FIG. 8 and the like.

Figure 9:
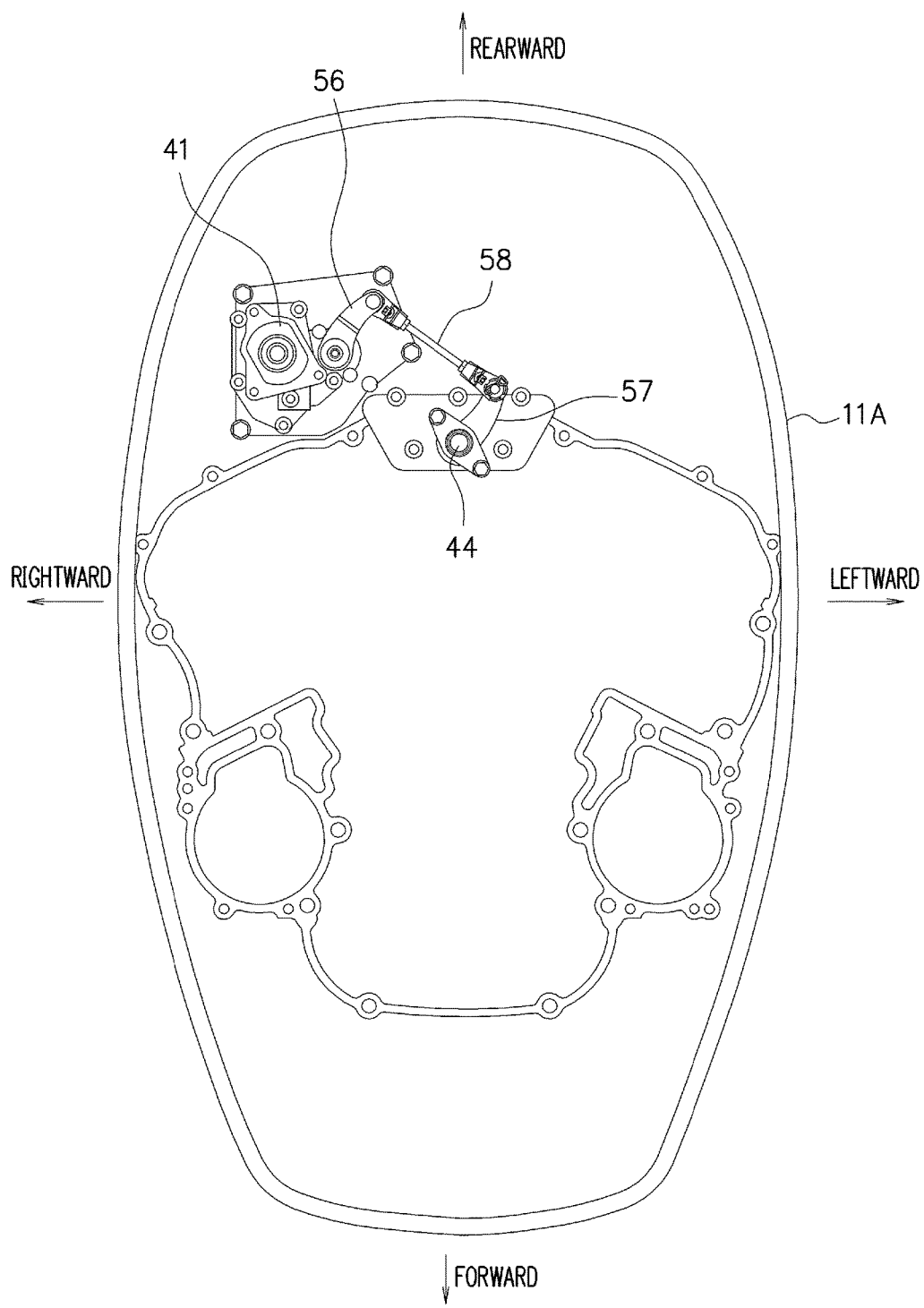
FIG. 9 is a top view illustrating the periphery of an electric shift actuator of the shifting device according to an embodiment of the present invention.

In a concrete configuration, the electric shift actuator 41 provided in the engine cover 11A (namely, in the engine room) is disposed on the lower side (refer to FIG. 2) and on the rear side of the engine room as illustrated in FIG. 9. A lever 56 is attached to a vertical output shaft of the electric shift actuator 41, and a lever 57 is attached to an upper end portion of the clutch rod 44. The lever 56 and the lever 57 are connected via a bar 58. The lever 56, the lever 57, and the bar 58 constitute a bell crank, which can transmit the rotational driving force of the electric shift actuator 41 to the clutch rod 44.

As illustrated in FIG. 7, a shift rod 59 is coaxially spline-coupled with a lower end of the clutch rod 44. The shift rod 59 has an upper side supported via a bearing 60 on the drive shaft housing 12A side, as illustrated in FIG. 6.

Figure 10:
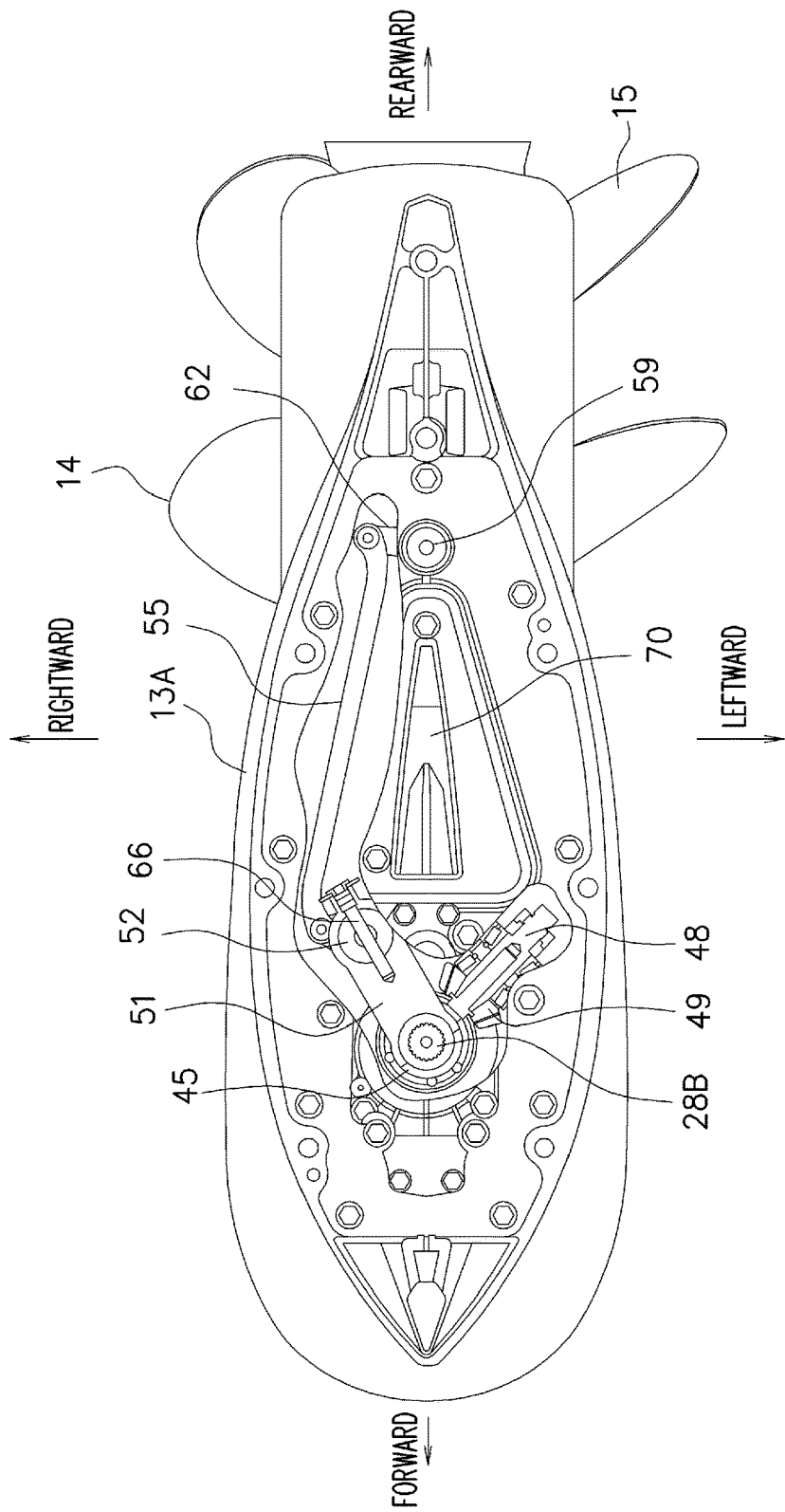
FIG. 10 is a partly broken plan view illustrating an exemplary configuration around a shift transmission mechanism according to an embodiment of the present invention.

Further, the shift rod 59 has a lower end portion supported via a bearing 61 on the gearcase 13A side as illustrated in FIG. 6. A lever 62 attached to the lower end portion of the shift rod 59 is connected to the shift bar 55 of the link mechanism 54. As illustrated in FIG. 10, the shift bar 55 extends substantially in the back and forth direction on the right side in the drive shaft housing 12A and is connected to the shift cam 52 via the lever 63 as understood from FIG. 11.

The shift cam 52 has an upper end portion supported via a bearing 64 on the drive shaft housing 12A side as illustrated in FIG. 8 and has a lower end portion supported via a bearing 65 on the gearcase 13A side. Further, the lower end portion of the shift cam 52 is spline-coupled with the lever 63 (refer to FIG. 11). The shift cam 52 has a cylindrical shape and, as illustrated in FIG. 11, a base portion 51a of the shift fork 51 is coupled with the shift cam 52 so as to be relatively rotatable. A shift fork pin 66 is inserted into the base portion 51a of the shift fork 51. The shift fork pin 66 penetrates the shift cam 52 while engaging with a lead groove 53. To engage with a central groove 45a of the dog clutch 45, the shift fork 51 can move in the vertical direction according to the rotation of the shift cam 52.

As apparent from FIG. 8 illustrating the forward/reverse shift mechanism 42, the upper gear 46 is spline-coupled at a lower end portion of the first input shaft 28A and rotates integrally with the first input shaft 28A. The upper gear 46 is rotatably supported via a bearing 67 (e.g., radial ball bearing, radial roller bearing, or the like). The upper gear 46 constantly transmits the rotational power, which is transmitted via the first input shaft 28A from the engine 17, to the intermediate gear 49.

The intermediate gear 49 is provided between the upper gear 46 and the lower gear 47 and constantly in mesh with the both. The intermediate gear 49 is connected to an axial end of the intermediate shaft 48, which is rotatably supported via a bearing 68 (e.g., tapered roller bearing or the like), and rotates integrally with the intermediate shaft 48. The intermediate shaft 48 is disposed in such a manner that a rotational axis thereof is perpendicular to the rotational axes of the upper gear 46 and the lower gear 47.

In the forward/reverse shift mechanism 42, the clutch member operating mechanism 50 and the intermediate shaft 48 perpendicular to the drive shaft 28 are arranged so as to deviate oppositely in the right-and-left direction, with respect to a front-rear center line passing through the center of the drive shaft 28. In the present embodiment, as illustrated in FIG. 10, the clutch member operating mechanism 50 is disposed on the right side and the intermediate shaft 48 is disposed on the left side.

Further, as understood from FIG. 8, the lower gear 47 is disposed coaxially with the upper gear 46 at a lower position spaced from the upper gear 46 by a predetermined distance. The lower gear 47 is rotatably supported via a bearing 69 (e.g., radial ball bearing, radial roller bearing, or the like). The rotational power is transmitted to the lower gear 47, via the intermediate gear 49, from the upper gear 46, although the lower gear 47 and the upper gear 46 rotate in mutually opposite directions. In this case, an upper end portion of the second input shaft 28B penetrates through and protrudes from an axial hole of the lower gear 47, and both of them can rotate independently.

The dog clutch 45 provided between the upper gear 46 and the lower gear 47 is, for example, spline-coupled with the upper end portion of the second input shaft 28B, so that the dog clutch 45 can rotate integrally with the second input shaft 28B and can reciprocate along the second input shaft 28B in the axial direction thereof (i.e., in the vertical direction). The dog clutch 45 has engaging claws 45b and 45c formed on upper and lower end surfaces thereof (refer to FIG. 7). Further, engaging claws 46a and 47a are formed on a lower surface of the upper gear 46 and an upper surface of the lower gear 47, respectively. When the dog clutch 45 moves upward, the engaging claw 45b on the upper end surface of the dog clutch 45 engages with the engaging claw 46a on the lower surface of the upper gear 46, and the dog clutch 45 rotates integrally with the upper gear 46. When the dog clutch 45 moves downward, the engaging claw 45c on the lower end surface of the dog clutch 45 engages with the engaging claw 47a on the upper surface of the lower gear 47, and the dog clutch 45 rotates integrally with the lower gear 47. When the dog clutch 45 stays at an intermediate position in its vertical movable range, the dog clutch 45 does not engage with the upper gear 46 and the lower gear 47. In this case, the rotational power of the first input shaft 28A cannot be transmitted to the second input shaft 28B.

As illustrated in FIG. 6 or FIG. 10, a gear oil chamber 70 is provided in the gearcase 13A of the lower unit 13. The forward/reverse shift mechanism 42 including the clutch member operating mechanism 50 is accommodated in the gear oil chamber 70 of the lower unit 13.

In the above-mentioned case, as illustrated in FIG. 3, the crankshaft of the engine 17 is disposed substantially vertically and right and left cylinder portions (including the cylinder block 20, the cylinder head 21, and the like) are arranged in a V shape opened rearward in plan view. An intake system unit, including the surge tank 22 and an intake pipe 71 for connecting the surge tank 22 to intake ports of the right and left cylinder portions, is disposed at a central region in the width direction on the rear side of the engine 17.

As apparent from the plan view (refer to FIG. 3) of the engine 17, a vapor separator 72 and a high-pressure fuel pump (not illustrated) are disposed on either the right side or the left side (on the left side in the present embodiment) of the intake system unit, and the electric shift actuator 41 is disposed on the other side (on the right side in the present embodiment). In this case, the clutch rod 44 and a link mechanism (e.g., the lever 57, the bar 58, and the like) for transmitting the driving force of the electric shift actuator 41 to the clutch rod 44 are disposed on the lower side of the intake system unit (refer to FIGS. 2 to 4).

Figure 13A:
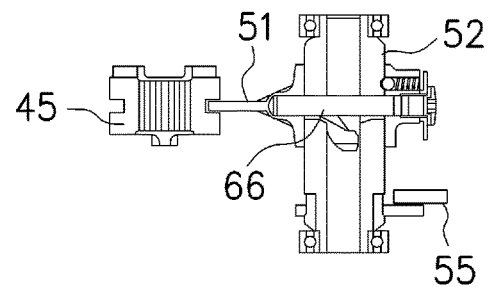
FIG. 13A is a cross-sectional side view illustrating a displacement action around a forward/reverse shift mechanism and the shift transmission mechanism according to an embodiment of the present invention.
Figure 13B:
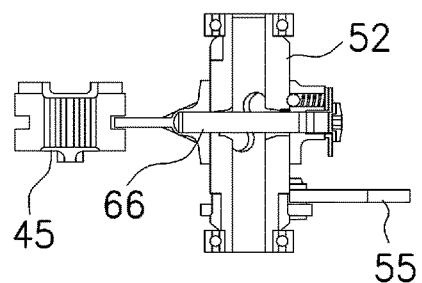
FIG. 13B is a cross-sectional side view illustrating a displacement action of the forward/reverse shift mechanism and the shift transmission mechanism according to an embodiment of the present invention.
Figure 13C:
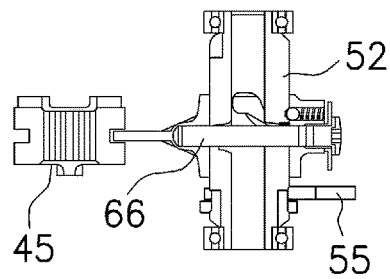
FIG. 13C is a cross-sectional side view illustrating a displacement action of the forward/reverse shift mechanism and the shift transmission mechanism according to an embodiment of the present invention.

In performing a shift operation of the shifting device 40, a ship operator of the outboard motor 10 drives the electric shift actuator 41 to rotate in either the forward direction or the reverse direction. The shift operation by the ship operator can be detected according to the movement of a shift lever, a button, or the like of a shift operating device provided in an operator's seat. Then, based on the detected shift operation, a drive control signal is sent to the electric shift actuator 41, so that the forward/reverse shift operation of the outboard motor 10 can be performed. When the electric shift actuator 41 is driven, the bell crank constituted by the lever 56, the lever 57, and the bar 58 is displaced to forward, neutral, and reverse positions, as illustrated in FIGS. 12A, 12B, and 12C. The forward/reverse shift mechanism 42 and the shift transmission mechanism 43 work correspondingly in such a way as to transmit the driving force of the electric shift actuator 41 to the clutch rod 44. Subsequently, the dog clutch 45 moves to forward, neutral, and reverse positions, as illustrated in FIGS. 13A, 13B, and 13C.

When the dog clutch 45 moves in the vertical direction, the dog clutch 45 engages with the upper gear 46 or the lower gear 47. Thus, the first input shaft 28A and the second input shaft 28B rotate in the same direction or opposite directions. Further, when the dog clutch 45 stays at an intermediate position in its vertical movable range, the dog clutch 45 does not engage with the upper gear 46 and the lower gear 47 and accordingly the rotational power output from the engine 17 cannot be transmitted to the second input shaft 28B. Accordingly, the shift position remains neutral. Driving the electric shift actuator 41 to move the dog clutch 45 in the vertical direction as mentioned above can perform switching of the shift position between the forward, reverse, and neutral positions.

In the shifting device 40 according to the present invention, no relative displacement occurs in the radial direction of the clutch rod 44 between the clutch rod 44 and the surrounding constituent components of the outboard motor 10. Therefore, the thickness of the clutch rod 44 can be increased to secure sufficient rigidity. Enhancing the rigidity of the clutch rod 44 can reduce the stroke caused by its deflection and can improve the accuracy in shift operation, and further can enhance the reliability of the shift operation because the transmissible operating force increases. Further, the distance between the steering shaft 25 and the drive shaft 28 can be reduced, so that the outboard motor 10 can be downsized. Locating the centroid of the outboard motor 10 close to the hull side can improve the acceleration of the ship because the ship can easily perform sliding travelling.

Further, the clutch rod 44 is disposed in the cooling water drop passage 33 provided on the rear side of the oil pan 31 and the exhaust passage 32.

Preventing the high-temperature exhaust gas discharged from the engine 17 from coming into direct contact with the clutch rod 44 can prevent deterioration of durability and sealing performance due to overheating of the seal rubber or the like disposed in the bearing portion of the clutch rod 44. Further, it is feasible to prevent carbons contained in the exhaust gas from the engine 17 from adhering to the sliding portion and wearing the seal rubber or the like, thereby preventing deterioration of the durability and the sealing performance.

Further, as illustrated in FIG. 8 and the like, the shift cam 52 is disposed on the rear side of the drive shaft 28.

Because the shift cam 52 can be located adjacently to the clutch rod 44, the length of the shift bar 55 of the link mechanism 54 can be shortened, thereby enhancing the durability and improving the power transmission efficiency as well as reducing the weight.

The clutch member operating mechanism 50 and the intermediate shaft 49 are arranged so as to deviate oppositely in the right-and-left direction, from the front-rear center line passing through the center of the drive shaft 28.

The intermediate shaft 48 supporting the intermediate gear 49 and the clutch member operating mechanism 50 are positioned on the rear side of the drive shaft 28 (i.e., the second input shaft 28B) and disposed at both sides in the right-and-left direction (refer to FIG. 10). Therefore, the lower unit 13 can be formed to have a narrow width in the right-and-left direction. Further, the outboard motor 10 can be downsized correspondingly. Narrowing the width of the lower unit 13 in the right-and-left direction can constitute the lower unit 13 with less propulsion loss caused by the resistance of water.

Further, the gear oil chamber 70 is provided in the gearcase 13A of the lower unit 13. The forward/reverse shift mechanism 42 including the clutch member operating mechanism 50 is accommodated in the gear oil chamber 70 of the lower unit 13.

The forward/reverse shift mechanism 42 including the clutch member operating mechanism 50 can be enhanced in rust resistance and can maintain smooth link operation with low friction.

Further, as apparent from the plan view (FIG. 3) of the engine 17, the vapor separator 72 and the high-pressure fuel pump are disposed on either the right side or the left side of the intake system unit and the electric shift actuator 41 is disposed on the other side. In this case, the clutch rod 44 and the link mechanism for transmitting the driving force of the electric shift actuator 41 to the clutch rod 44 are disposed on the lower side of the intake system unit.

Disposing the electric actuator 41 close to the front pilot shaft can reduce the moment of inertia around the pilot shaft and can improve the operability of the outboard motor 10. At the same time, the upper unit 11, in which the engine 17 and the electric actuator 41 of the outboard motor 10 are mounted, can be downsized.

Although the embodiments according to the present invention have been described in detail with reference to the attached drawings, the embodiments merely illustrate concrete examples for carrying out the present invention. The technical scope of the present invention is not to be construed in a restrictive manner by these embodiments. That is, the present invention may be implemented in various forms without departing from the spirit thereof, and the technical scope of the present invention encompasses these modifications.

For example, the arrangement relationship between the clutch member operating mechanism 50 and the intermediate shaft 49 with respect to the center line in the right-and-left direction passing through the center of the drive shaft 28 may be reversed in the right-and-left direction.

Further, the arrangement relationship between the vapor separator 72, the high-pressure fuel pump, and the electric shift actuator 41 may also be reversed in the right-and-left direction.

Although the example of the outboard motor having the contra-rotating propeller has been described in the above-mentioned embodiments of the present invention, the present invention can be effectively applied to an outboard motor having a single propeller and similar functions and effects can be obtained.

According to the present invention, there is no relative displacement in the radial direction of the clutch rod between the clutch rod and constituent components of the outboard motor arranged around the clutch rod. Therefore, the thickness of the clutch rod can be increased to secure sufficient rigidity.

What is claimed is:

1. A shifting device for an outboard motor configured to detect a shift operation by a ship operator and electrically perform a forward/reverse shift operation for the outboard motor based on the detected shift operation, wherein
the outboard motor includes an upper unit, a lower unit, and an intermediate unit connecting the upper unit to the lower unit,
an electric shift actuator is provided in an engine cover in which an engine of the upper unit is accommodated,
a forward/reverse shift mechanism is provided in the lower unit,
a shift transmission mechanism including a clutch rod is provided to transmit driving force of the electric shift actuator to the forward/reverse shift mechanism by connecting the electric shift actuator with the forward/reverse shift mechanism, and the clutch rod is disposed vertically in the intermediate unit on the rear side of a drive shaft that transmits driving force of the engine.

2. The shifting device for the outboard motor according to claim 1, wherein the engine includes an oil pan, an exhaust passage, and a cooling water drop passage provided in the intermediate unit and positioned on the rear side of the drive shaft, and the clutch rod is disposed in the cooling water drop passage positioned on the rear side of the oil pan and the exhaust passage.

3. The shifting device for the outboard motor according to claim 1, wherein the forward/reverse shift mechanism includes a first input shaft rotated by the engine and a second input shaft disposed coaxially with the first input shaft and to which rotation of the first input shaft is transmitted, a clutch member is supported rotatably and integrally with the second input shaft, an upper gear is rotated by the first input shaft, a lower gear is reversely rotated with respect to the upper gear, an intermediate gear is disposed between the upper gear and the lower gear and supported by an intermediate shaft perpendicular to the drive shaft, and a clutch member operating mechanism is provided to move the clutch member to forward, neutral, and reverse positions, the clutch member operating mechanism includes a shift fork, a shift cam having a helical lead groove and rotatably supported, and a link mechanism configured to connect the shift cam and the clutch rod with a shift bar, and the shift cam is disposed on the rear side of the drive shaft.

4. The shifting device for the outboard motor according to claim 3, wherein the forward/reverse shift mechanism is configured in such a manner that the clutch member operating mechanism and the intermediate shaft are arranged so as to deviate to one side and the other side in the left and right direction with respect to a front-rear center line passing through a center of the drive shaft.

5. The shifting device for the outboard motor according to claim 3, wherein the forward/reverse shift mechanism including the clutch member operating mechanism is accommodated in a gear oil chamber provided in a gearcase of the lower unit.

6. The shifting device for the outboard motor according to claim 1, wherein the engine is a vertical type having a crankshaft disposed substantially vertically and right and left cylinder portions arranged in a V shape opened rearward in plan view, an intake system unit, including a surge tank and an intake pipe for connecting the surge tank to intake ports of the right and left cylinder portions, is disposed at a central region in a width direction on the rear side of the engine, a vapor separator and a high-pressure fuel pump are disposed on either the right side or the left side of the intake system unit in plan view of the engine, and an electric actuator is disposed on the other side, and the clutch rod and a link mechanism for transmitting driving force of the electric actuator to the clutch rod are disposed on the lower side of the intake system unit.

* * * * *